United States Patent
Jayasena et al.

(10) Patent No.: US 9,875,195 B2
(45) Date of Patent: Jan. 23, 2018

(54) DATA DISTRIBUTION AMONG MULTIPLE MANAGED MEMORIES

(71) Applicant: Advanced Micro Devices, Inc., Sunnyvale, CA (US)

(72) Inventors: Nuwan S. Jayasena, Sunnyvale, CA (US); Lisa R. Hsu, Durham, NC (US); James M. O'Connor, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 162 days.

(21) Appl. No.: 14/459,958

(22) Filed: Aug. 14, 2014

(65) Prior Publication Data

US 2016/0048327 A1     Feb. 18, 2016

(51) Int. Cl.
    *G06F 13/16*     (2006.01)

(52) U.S. Cl.
    CPC ...... *G06F 13/1657* (2013.01); *G06F 13/1647* (2013.01)

(58) Field of Classification Search
    None
    See application file for complete search history.

(56) References Cited

U.S. PATENT DOCUMENTS

| | | | |
|---|---|---|---|
| 5,715,476 A * | 2/1998 | Kundu | G06F 13/28 710/35 |
| 5,809,555 A | 9/1998 | Hobson | |
| 6,097,401 A * | 8/2000 | Owen | G06F 3/14 345/519 |
| 6,453,380 B1 | 9/2002 | Van Lunteren | |
| 7,318,114 B1 | 1/2008 | Cypher | |
| 8,108,564 B2 * | 1/2012 | Hofstee | G06F 3/1423 710/8 |
| 8,806,103 B2 | 8/2014 | Shaw | |
| 2006/0129795 A1 * | 6/2006 | Bulusu | G06F 9/4401 713/2 |
| 2006/0184716 A1 * | 8/2006 | Hsieh | G11C 7/1042 711/103 |
| 2007/0076008 A1 * | 4/2007 | Osborne | G06T 1/60 345/541 |
| 2008/0294705 A1 * | 11/2008 | Brauckhoff | G06F 12/08 |
| 2010/0082893 A1 * | 4/2010 | Ma | G06F 12/0246 711/103 |
| 2012/0221785 A1 | 8/2012 | Chung et al. | |

FOREIGN PATENT DOCUMENTS

| | | |
|---|---|---|
| EP | 1653364 | 9/2008 |
| WO | 2013124449 | 8/2013 |

\* cited by examiner

*Primary Examiner* — Reginald Bragdon
*Assistant Examiner* — James J Thomas
(74) *Attorney, Agent, or Firm* — Meyertons, Hood, Kivlin, Kowert & Goetzel, P.C.

(57) ABSTRACT

A system and method are disclosed for managing memory interleaving patterns in a system with multiple memory devices. The system includes a processor configured to access multiple memory devices. The method includes receiving a first plurality of data blocks, and then storing the first plurality of data blocks using an interleaving pattern in which successive blocks of the first plurality of data blocks are stored in each of the memory devices. The method also includes receiving a second plurality of data blocks, and then storing successive blocks of the second plurality of data blocks in a first memory device of the multiple memory devices.

20 Claims, 8 Drawing Sheets

(a) Fine-grain interleaving (b) Course-grain interleaving

DATA DISTRIBUTION AMONG MULTIPLE MANAGED MEMORIES

BACKGROUND

Technical Field

This invention is related to the field of semiconductor memories and more specifically to the implementation of memory management systems.

Description of Related Art

Semiconductor memories, such as, for example, Random Access Memory (RAM), are integral to many modern computing devices such as desktop computers, laptop computers, tablet computers, and smartphones, just to name a few. Consumer demand for increased performance and features along with demand for more storage capacity drives the configuration of memories used in these computing devices. For example, volatile or non-volatile memories may be implemented in a computing system such that multiple memory die may be accessed in parallel by a host processor in the system. Such parallel access may increase an amount of data that can be read or written in a given time period, allowing for faster data movement which may increase overall system performance.

In some computing systems, additional processors or peripherals may be included. The additional processors or peripherals, however, may not be capable of accessing a same number of memory die in parallel as the host processor. In such cases, the additional processors or peripherals may use separate independent memory dies. Such a memory configuration may, however, lead to a less efficient usage of a total memory in the system.

A method is desired in which system memory may be used efficiently by processors capable of reading multiple memory die in parallel, and yet shared with processors with limited access to memory die in parallel. Systems and methods for efficient sharing of memory in a parallel arrangement are presented herein.

SUMMARY OF EMBODIMENTS

Various embodiments of a computing system are disclosed. Broadly speaking, an apparatus, a system and a method are contemplated in which the apparatus includes a plurality of memory devices, a coprocessor coupled to a first memory device of the plurality of memory devices, and a processor coupled to each of the plurality of memory devices. The processor may be configured to receive a first plurality of data blocks for storage in the plurality of memory devices, and store successive data blocks of the first plurality of data blocks in an interleaved pattern across each one of the plurality of memory devices. The processor may further be configured to receive a second plurality of data blocks for storage in the plurality of memory devices and store successive data blocks of the second plurality of data blocks in the first memory device of the plurality of memory devices upon determining the coprocessor will access the second plurality of data blocks. Data blocks of the first plurality of data blocks may be of equal size to the data blocks of the second plurality of data blocks.

In another embodiment, data stored in the first memory device may include at least one data block of the first plurality of data blocks and two or more data blocks of the second plurality of data blocks. In a further embodiment, the first memory device may include a plurality of memory dies, and at least one data block may be stored in a first memory die of the plurality of memory dies, and at least two or more data blocks may be stored in a second memory die of the plurality of memory dies.

In a given embodiment, the processor may store additional data blocks of the second data in a second memory device of the plurality of memory devices upon determining that the first memory device cannot store further data blocks of the second plurality of data blocks.

In one embodiment, the processor may be further configured to store each of a first contiguous subset of the data blocks of the first plurality of data blocks in a respective first block of each memory device of the plurality of memory devices before storing each of a second contiguous subset of the data blocks of the first plurality of data blocks in a respective second block of each memory device of the plurality of memory devices.

In an embodiment, the coprocessor may be configured to receive a third plurality of data blocks and store data blocks of the third plurality of data blocks in contiguous storage locations of the first memory device. In another embodiment, the processor may be further configured to allocate a pre-determined amount of storage locations of the first memory device for storing data that is to be accessed by the coprocessor.

Figure 1:
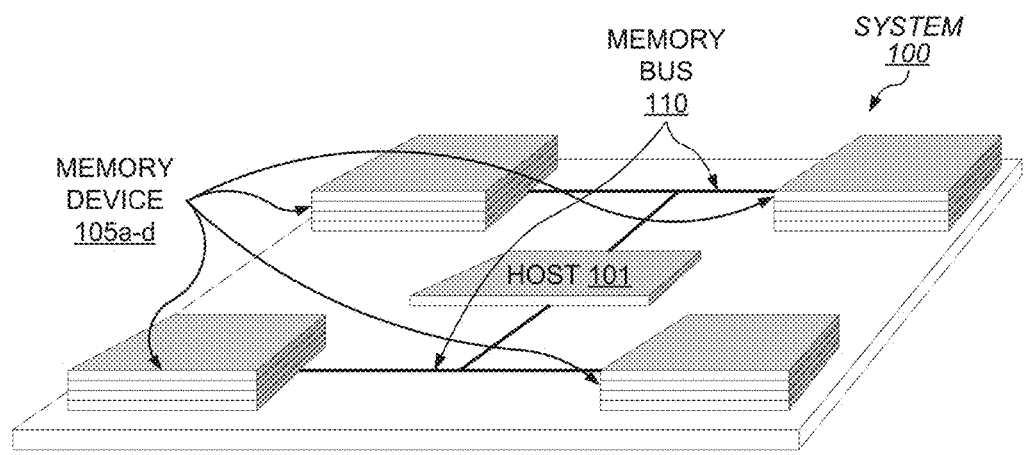
FIG. 1 is a block diagram illustrating an embodiment of a computer system with multiple memory devices.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

A first embodiment of a computing system may include multiple memory devices, which may be accessed in parallel by a host processor. This one system may also include a coprocessor capable of accessing one or more of the memory devices, but not capable of reading as many in parallel as the host processor. A second embodiment of a computing system may also include multiple memory devices. In the second embodiment, a host processor may access data for a given data set sequentially from a first memory device followed by a second memory device. The host processor may access a portion of the data set from several memory devices before returning to the first memory device to access a next portion of the data set. In contrast, a coprocessor of the second embodiment may access data from only one or a few of the multiple memory devices.

In both the first and second embodiments, the host processor may perform faster if data is arranged one way in the multiple memory devices and the coprocessor may perform faster if data is arranged in another way in the memory devices. The embodiments illustrated in the drawings and described herein may provide a process for arranging data in a computer system with multiple memory devices such that data is organized based upon whether the host or the coprocessor is the primary user of the data file.

An embodiment of a computing system is illustrated in FIG. 1. System 100 may include host processor 101, coupled to memory devices 105a-d via memory bus 110. In some embodiments, memory devices 105a-d may be capable of communicating to each other either via memory bus 110 or by an alternative bus (not shown).

Host processor 101 may, in some embodiments, be implemented as a general-purpose processor that performs computational operations responsive to the execution of instructions associated with application software stored memory, such as any of memory devices 105a-d or other system memory not shown in FIG. 1. In other embodiments, host processor 101 may be a central processing unit (CPU) such as a microprocessor or a microcontroller that also performs computational operations responsive to the execution of instructions associated with application software. Host processor 101 may, in various embodiments, be implemented an application-specific integrated circuit (ASIC), or a field-programmable gate array (FPGA), or may include multiple CPU cores and my include a combination of hardware and software elements.

In various embodiments, host processor 101 may implement any suitable instruction set architecture (ISA), such as, e.g., x86, ARM™, MIPS®, or PowerPC™ ISAs. Host processor 101 may include one or more bus transceiver units that allow processor 101 to communicate to other functional blocks within SoC 100 such as, memory block 102, for example.

Memory devices 105a-d may include one or more types of memory. For example, in various embodiments, memory devices 105 may include Dynamic Random Access Memory (DRAM), Static Random Access Memory (SRAM), NAND Flash memory, NOR flash memory, Ferroelectric Random Access Memory (FeRAM), or any other suitable data storage medium. Each memory device 105 may include one or more memory die. Only four memory devices 105 are illustrated in FIG. 1, in other embodiments, however, system 100 may include any suitable number of memory devices.

Memory devices 105 are coupled to host processor 101 by memory bus 110. Memory bus 110 may be a dedicated memory bus for host processor 101. In other embodiments, memory bus 110 may couple host processor 101 to other functional blocks in addition to memory devices 105. In some embodiments, memory devices 105 may be capable of communicating to one another through memory bus 110. In such embodiments, the communication between memory devices 105 may be limited in speed or in the number of devices accessed in parallel.

Host processor 101 may be capable of accessing one memory device (e.g. memory device 105b) at a time, all memory devices 105 in parallel, or a subset of the total, such as, for example, memory device 105c and memory device 105d in parallel. The method in which host processor 101 accesses memory devices 105 may reflect a form of interleaving used to access data. Interleaving may refer to a pattern for arranging data across two or more memory devices. More details on interleaving will be discussed later.

System 100 of FIG. 1 is merely an example of a computing system and only includes features for demonstrating the concepts disclosed herein. System 100 may include other functional blocks not shown for the sake of clarity. For example, other functional blocks may include coprocessors, display controllers, audio codecs, etc.

Figure 2:
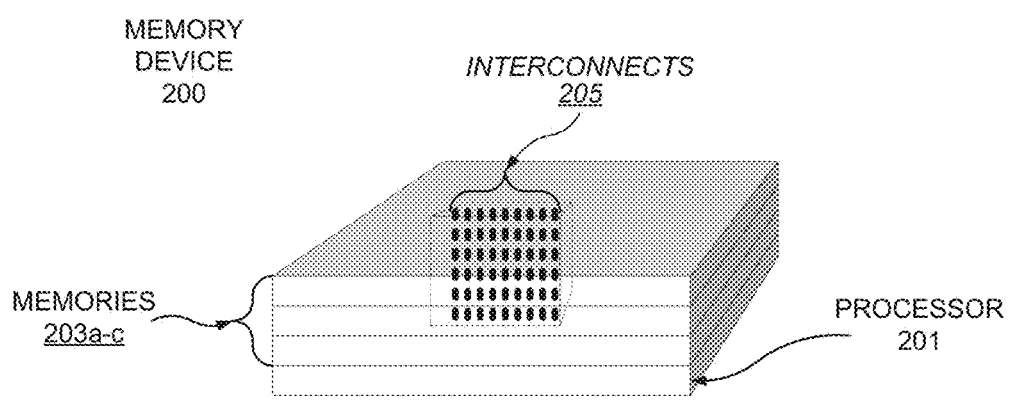
FIG. 2 is a block diagram illustrating an embodiment of a memory device.

Turning to FIG. 2, an embodiment of a memory device is illustrated. Memory device 200 may correspond to one instance of memory devices 105 in FIG. 1. Memory device 200 may include processor 201, memories 203a-c, and interconnects 205. Memory device 200 is illustrated in FIG. 2 as a series of die stacked one on top of another. In other embodiments, however, various other configurations of memory dies may be utilized, such as, for example, one or more dies mounted to a common substrate, individually packaged dies connected on a common circuit board, or any combinations thereof.

Processor 201 may be a general-purpose processor, similar to host processor 101 in FIG. 1. In various embodiments, processor 201 may be a special purpose processor such as a graphics processor or an audio processor, and processor 201 may act as a coprocessor, off-loading general or specific tasks from host processor 101. Processor 201 may, in some embodiments, perform functions to manage usage of the memory die, while in other embodiments, memory management functions may be included on one or more of the individual memory die. Processor 201 may include a single CPU core or may include multiple CPU cores.

Memories 203a-c may be, in various embodiments, any suitable type of data storage medium as described above in regards to memory device 105. Memories 203 may be all one single type of memory, such as, for example, DRAM, or, in other embodiments, be a mix of memory types, such as, for example, DRAM, SRAM, and NAND flash. Although the illustrated embodiment includes three memories, other embodiments of memory device 200 may include any number of memories as needed by the encompassing systems, such as system 100.

Processor 201 may communicate to memories 203 by way of interconnects 205. In the stacked die arrangement illustrated in FIG. 2, interconnects 205 may include Through-Silicon Vias (TSV, also referred to as Through-Silicon Stacking or TSS) in which an electrical connection is created through each die in the stack. In other embodiments, interconnect 205 may include wire bonds, solder bumps, or traces on a silicon substrate or circuit board. Some embodiments may utilize a combination of these or other interconnection methods.

The memory device depicted in FIG. 2 is merely an example for demonstrative purposes, and, as such, only includes features for demonstrating concepts are disclosed herein. Other embodiments may include more or fewer memory die, or may include more than one processor die.

Figure 3:
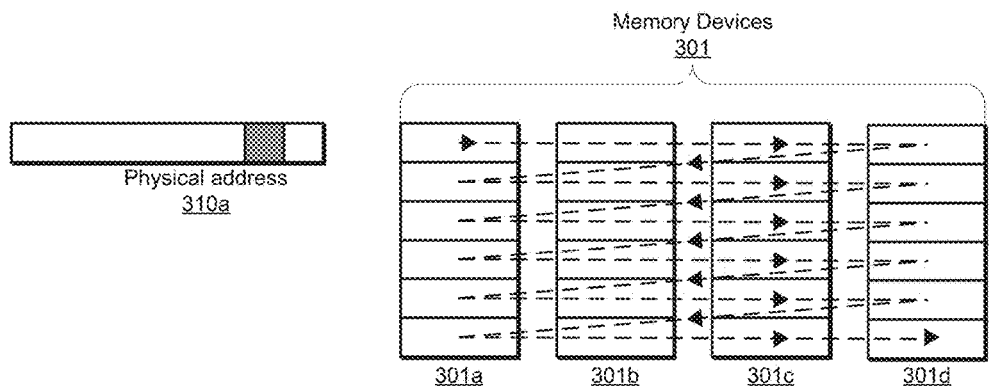
FIG. 3 is a block diagram representing two embodiments of memory interleaving patterns.
Figure 3:
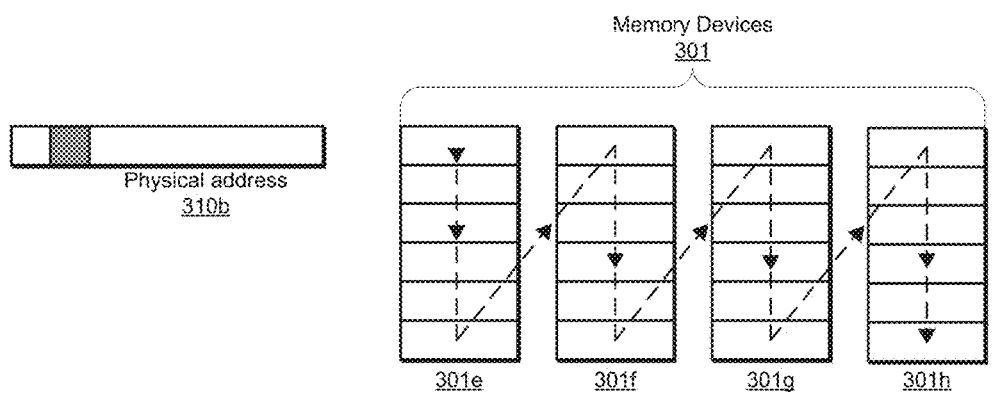

Turning now to FIG. 3, two interleaving patterns are illustrated for accessing four memory devices in a system, such as for example, system 100 in FIG. 1. FIG. 3(a) illustrates a fine-grain interleaving pattern and includes memory devices 301a-d, which may be accessed according to physical address 310a. FIG. 3(b) illustrates a coarse-grain interleaving pattern and includes memory devices 301e-h, which may be accessed according to physical address 310b. The dashed lines shown on memory devices 301a-d and on memory devices 301e-h represent an order in which data may be written into the memory devices.

In the fine-grain interleaving example of FIG. 3(a), each memory device 301a-d may be subdivided into blocks. When data is sent for storage in memory devices 301a-d, the data may also be divided into blocks and contiguous blocks may be stored successively in memory device 301a-d. For example, if contiguous data is received that would fill three blocks of memory, the received data may be stored consecutively in memory device 301a, in memory device 301b and then in memory device 301c. If subsequent contiguous data is received that would fill four blocks of memory, then the subsequently received data may be stored consecutively, starting in memory device 301d, and then returning to memory device 301a, followed by memory device 301b and completing in memory device 301c. In this fine-grain interleaving embodiment, a less significant bit or group of bits in physical address 310a may be used to determine in which memory device of memory devices 301a-d a given word of data may be stored.

In some embodiments, fine-grain interleaving may provide for quicker access to memory devices 301a-d by a processor that can access all memory devices with similar access speeds. In system 100 in FIG. 1, for example, host processor 101 may be able to access memory devices 105a-d in parallel, thereby reading or writing data up to four times faster than if all data was stored in a single memory device. On the other hand, the opposite may be true for a processor with limited access to all but one memory device. For example, if memory device 105a corresponds to memory device 200 in FIG. 2, then processor 201 in FIG. 2 may have high-speed access to memories within memory device 105a. Processor 201 may, however, have comparatively slow speed access to memory devices 105b-d. Therefore, in this example, data stored with fine-grain interleaving may be accessed slower by processor 201 compared to data stored in memories 203a-c only.

In the coarse-grain interleaving example of FIG. 3(b), each memory device 301e-h may not be subdivided and instead, data may be stored in a single memory device until the single memory device is full. For example, if data is received that would fill one-half of a given memory device, the data may be stored all in memory device 301e, consuming half of the capacity of memory device 301e. If subsequent data is received that would fill an entire memory device, the subsequent data may be stored starting in the next available location in memory device 301e and then once memory device 301e is full, remaining subsequent data may be stored in memory device 301f, consuming one-half of the capacity of memory device 301f. In a coarse-grain interleaving embodiment, a more significant bit or group of bits in physical address 310b may determine in which memory device of memory devices 301e-f a given word of data may be stored.

In contrast to the fine-grained interleaving example of FIG. 3(a), coarse-grained interleaving may provide slower access to memory devices 301e-h for a processor that can access all memory devices in parallel with similar access speeds. For example, in the embodiment of FIG. 1, host processor 101 may be able to access memory devices 105a-d in parallel. If data is stored using coarse-grained interleaving, then host processor 101 may be limited to reading a single memory device, such as, e.g., memory device 105a, at a time to access stored data, while memory devices 105b-d may be idle. On the other hand, for a processor with limited access to all but one memory device, the opposite may be true. For example, if memory device 105a corresponds to memory device 200 in FIG. 2, then processor 201 in FIG. 2 may have high-speed access to memories within memory device 105a. Processor 201 may, therefore, be capable of quickly accessing data stored in 105a compared to data stored across memory devices 105b-d.

It is noted that the interleaving patterns depicted in FIG. 3 are merely examples to demonstrate memory interleaving concepts. In other embodiments, different numbers of memory devices and interleaving patterns may be employed.

Figure 4:
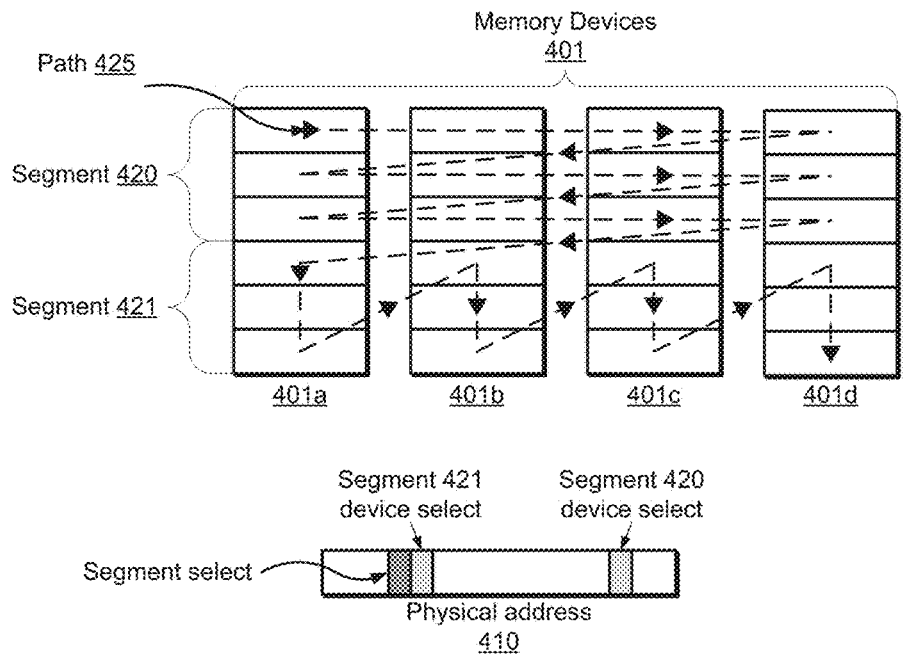
FIG. 4 is a block diagram representing an embodiment of a memory interleaving pattern combining fine-grained and coarse-grained interleaving.

Moving to FIG. 4, an interleaving pattern is illustrated in which some limitations of the previously discussed interleaving patterns may be addressed. The illustrated embodiment of FIG. 4 may be used in conjunction with a system such as system 100 in FIG. 1. The interleaving pattern of FIG. 4 may be applied to memory devices 401a-d which may be accessed according to physical address 410. Path 425, as shown by the dashed lines, may indicate an order which the interleaving pattern follows.

Memory devices 401a-d may be subdivided into blocks of memory as previously discussed. In this embodiment, however, the memory blocks may be organized into multiple segments per memory device 401a-d. A memory segment may include a same number of blocks from each memory device 401a-d. In other embodiments, a memory segment may include a different number of blocks from each memory device 401a-d, including zero blocks from a given memory device. With regards to a memory device with multiple memory die, such as, e.g., memory device 200, as illustrated in FIG. 2, a memory segment may correspond to a respective die in the memory device. In the embodiment of FIG. 4, memory devices 401a-d are divided into two segments, segment 420 and segment 421, each including three memory blocks from each memory device 401a-d. Segment 420 may be organized in a fine-grain interleaving pattern, as shown by the dashed lines. Segment 421, on the other hand, may be organized into a coarse-grain interleaving pattern, as shown by the dashed lines again.

Fine-grained segment 420 may, in some embodiments, provide an efficient storage for a processor with high access speeds to each of memory devices 401a-d. Applying the interleaving pattern of FIG. 4 to system 100 of FIG. 1, with memory devices 401a-d corresponding to memory devices 105a-d, host processor 101 may prefer to read and write data to segment 420 to allow for higher-speed parallel access to memory devices 401a-d. In addition, each memory device 401a-d may correspond to memory device 200 in FIG. 2, and as such, each memory device 401a-d may include a processor, such as processor 201. Processor 201 may have higher-speed access only to the encompassing memory device. For example, memory device 401a may include processor 201a (not illustrated) and processor 201a may access data in memory 401a faster than it can access data in memory devices 401b-d. Processor 201a may, in such an embodiment, prefer to read and write data to segment 421 of memory device 401a.

Physical address 410 may be used, in some embodiments, to determine, or "map," a segment and a memory device to be accessed in addition to the location in the determined memory device. Various bits in physical address 410 may correspond to a segment select and a memory device select. The address bits corresponding to the segment select may be more significant than the bits selecting the memory device since the selection of segments may determine the type of interleaving pattern used, which may determine how a memory device is chosen.

It is noted that FIG. 4 is merely an example of an interleaving pattern for a system with multiple memories. In various embodiments, more or fewer memory devices may be included. Other embodiments may also utilize different interleaving patterns, such as including more than two segments and a different number than 3 blocks per segment.

Figure 5:
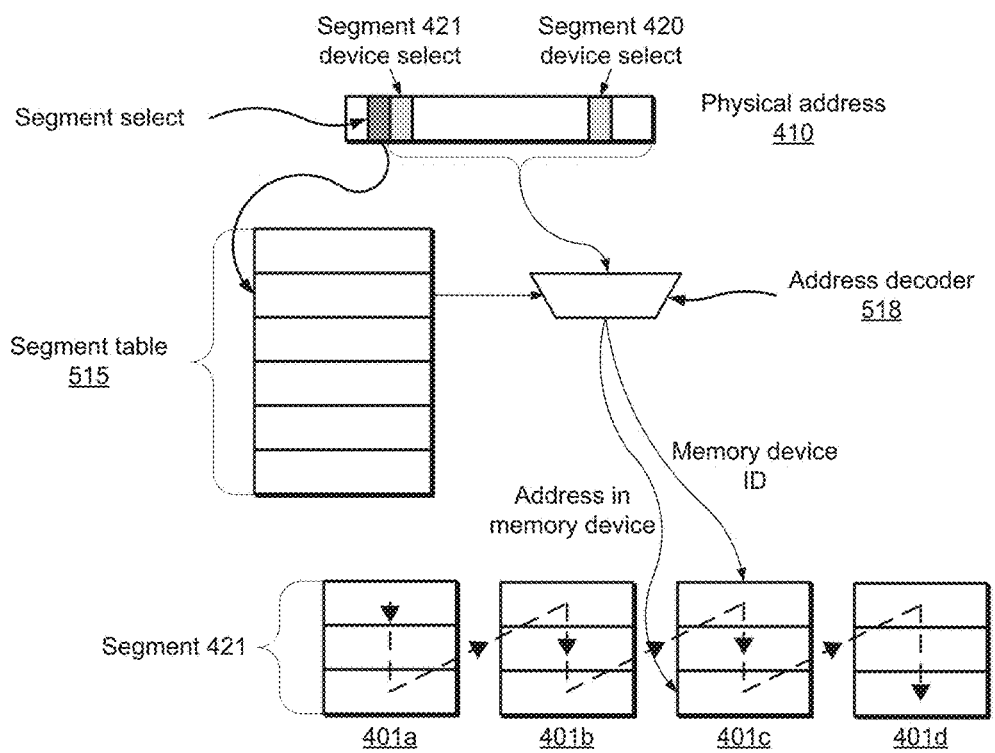
FIG. 5. is a block diagram illustrating address decoding for the embodiment of FIG. 4.

A more detailed example of address mapping is illustrated in FIG. 5. Physical address 410 is shown again in FIG. 5 and may be coupled to segment lookup table 515 and address decoder 518. Address decoder 518 may be coupled to memory devices 401a-d.

One or more address bits, corresponding to the segment select bits, may be used to select an entry (i.e., a "segment entry") from segment lookup table 515. The segment entry may correspond to a given segment. The number of entries in segment lookup table 515 may, therefore, equal the number of segments defined in the system. In other embodiments, each segment in the system may have multiple entries, thereby allowing for multiple configurations. In such an embodiment, which configuration to be used may be determined by user input, an amount of memory available, a particular application running on the system, or a combination thereof.

The segment entry may include a value that may be passed on to address decoder 518. Address decoder 518 may use the passed value to identify which of memory devices 401a-d to access, along with a local address value for the location within the identified memory device. The passed value may be an address mask, i.e., a value that, when combined with at least some bits of physical address 410 in address decoder 518, produces a memory device identifier and an address for use within the identified memory device.

For example, a given physical address may include segment select bits that correspond to segment 421. Segment lookup table 515 may send a corresponding address mask to address decoder 518. Since segment 421 from FIG. 4 includes a coarse-grained interleaving pattern, the address mask may cause address decoder 518 to use one or more of the more significant bits of physical address 410 to determine the memory device identifier, which is, in the illustrated example, memory device 401c. If instead, segment 420 were to be accessed, a different address mask might cause address decoder 518 to use one or more of the less significant bits of physical address 410 to determine the memory device identifier. Remaining bits of physical address 410 may be used as the address within memory device 401c. In some embodiments, the remaining bits may need to be further decoded in order to address the correct locations corresponding to segment 421 within memory device 401c since the memory device may include multiple segments, such as in this example.

It is noted that the illustration of FIG. 5 is merely an example for the purpose of demonstration. In other embodiments, additional or different functional blocks may be included in the address mapping task. Segment lookup tables and address decoders may be implemented using combinational logic, implemented in firmware, or a combination thereof. In some embodiments, a microcontroller, or processor executing program instructions, may be used to implement address mapping functions.

Figure 6:
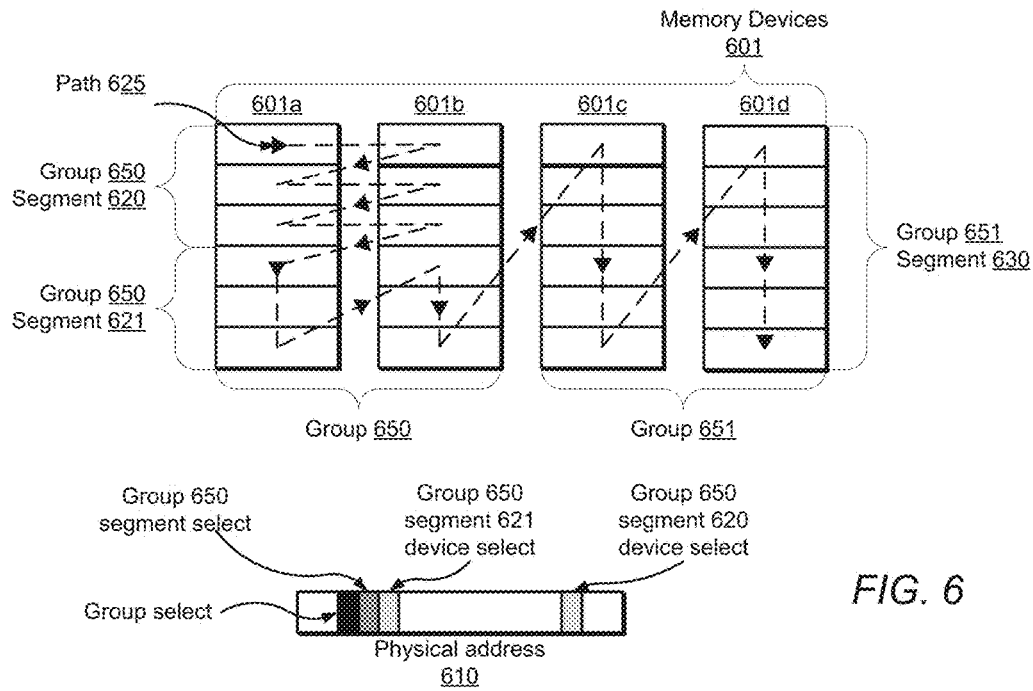
FIG. 6 is a block diagram representing another embodiment of a memory interleaving pattern combining fine-grained and coarse-grained interleaving.

Turning to FIG. 6, an interleaving pattern is illustrated in which an additional level of organization is included. The illustrated embodiment of FIG. 6 may be used in conjunction with a system such as system 100 in FIG. 1. The interleaving pattern of FIG. 6 may apply to memory devices 601a-d, which may be accessed according to physical address 610. Path 625, as shown by the dashed lines, may indicate an order which the interleaving pattern follows.

In the illustrated embodiment, each of memory devices 601a-d may be assigned to one of a plurality of groups. Each group may be organized into blocks of memory as previously discussed. In this embodiment, the memory blocks may be organized into one or more segments per group. A memory segment may include a same number of blocks from each memory device in a given group. In other embodiments, a memory segment may include a different number of blocks from each memory device in the group. In the embodiment of FIG. 6, memory devices 601a-d are divided into two groups, group 650 including memory devices 601a-b and group 651 including memory devices 601c-d. Group 650 is divided into two segments, segment 620 and segment 621. Group 651, however, includes only segment 630. Segment 620 may be organized in a fine-grain interleaving pattern, as shown by the dashed lines. Segment 621 and segment 630, on the other hand, may be organized into coarse-grain interleaving patterns, again shown by the dashed lines.

Fine-grained segment 620 may, in some embodiments, provide an efficient storage for a processor with high access speeds to memory devices 601a-b of group 650. Applying the interleaving pattern of FIG. 6 to system 100 of FIG. 1, with memory devices 601a-d corresponding to memory devices 105a-d, host processor 101 may prefer to read and write data to segment 620 to allow for higher-speed parallel access to memory devices 601a-b of group 650. Applying the configuration of memory device 200 in FIG. 2 to each memory device 601a-d, each memory device 601a-d may include a processor, such as processor 201. As previously discussed, processor 201 may have high-speed access only to the encompassing memory device. For example, memory device 601*b* may include processor 201*b* (not illustrated) and memory device 601*d* may include processor 201*d* (also not illustrated). Processor 201*b* may access data in memory 601*b* faster than it can access data in the other memory devices. Processor 201*b* may, in such an embodiment, prefer to read and write data to segment 621 of memory device 601*b* in group 650. Likewise, processor 201*d* may access data in memory device 601*d* faster than it can access data from the other memory devices and therefore may prefer reading and writing data to segment 630 of memory device 601*d* within group 651.

An interleaving pattern such as shown in FIG. 6 may be utilized for a variety of reasons in different embodiments. One such reason may relate to the functions of processors included in one or more of the memory devices. As discussed in the description of FIG. 2, a given processor 201 may provide any of a number of functions, such as, e.g., graphics processing, which may be a memory intensive task requiring high-speed access to data. In the embodiment of FIG. 6, if processor 201*d* is a graphics processor and has high-speed access to memory device 601*d* than to the other memory devices, then memory device 601*d* may be used primarily to store data related to processing video frame data to be displayed on a monitor. Likewise, a processor included in memory device 601*c* may be an audio processor with similar requirements for accessing audio files from memory device 601*c*.

In some embodiments, physical address 610 may be used to map a segment, a group, and a memory device to be accessed as well as the location in the mapped memory device. Various bits in physical address 610 may correspond to a group select, a segment select within the group, and a memory device select within the segment. The address bits corresponding to the group select may be more significant than the bits selecting the segment or memory device since the selection of the group may determine what segments are available. Next, the bits selecting the segment may be more significant than the bits selecting the memory device since the selection of the segment may determine the type of interleaving pattern used, which may determine how a memory device is chosen.

It is noted that the illustration of FIG. 6 is merely an example of an interleaving pattern for a system with multiple memories. Various details of the system have been omitted to simplify the illustration for clarity. Other embodiments may include more or fewer memory devices. Alternative embodiments may also utilize different interleaving patterns, such as including more than one or two segments in a group.

Figure 7:
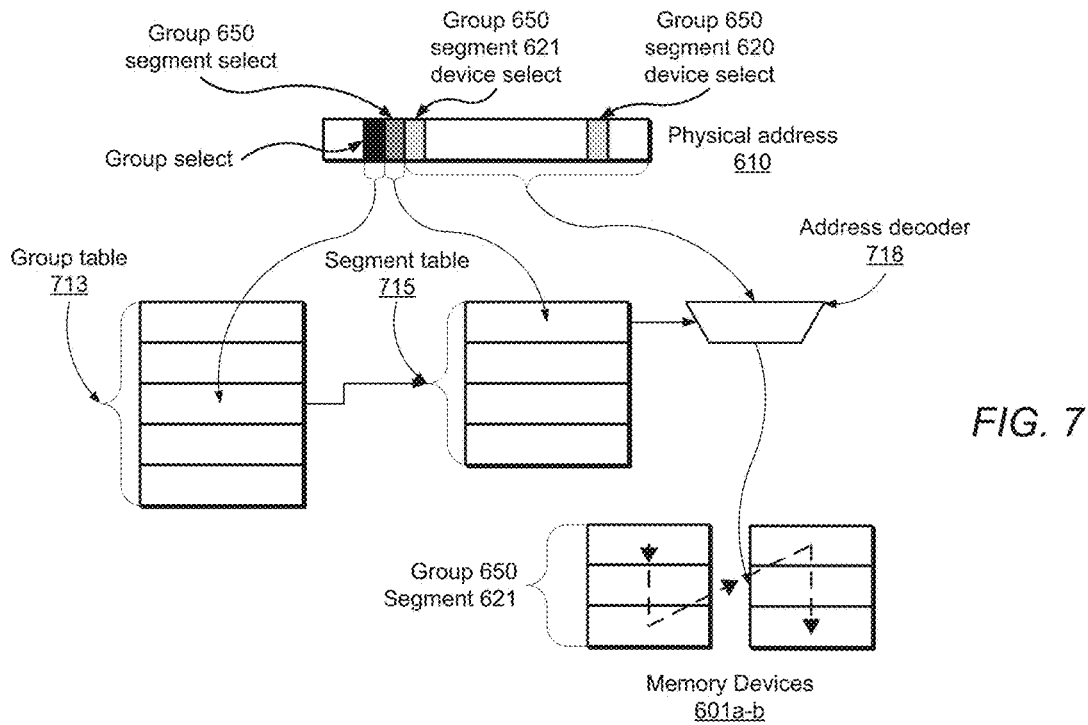
FIG. 7 is a block diagram illustrating address decoding for the embodiment of FIG. 6.

An example of address mapping for the embodiment shown in FIG. 6 is illustrated in FIG. 7. Physical address 610 is shown again in FIG. 7 and may be coupled to group lookup table 713, segment lookup table 715, and address decoder 718. Address decoder 718 may be coupled to memory devices 601*a-d*, although only memory devices 601*a-b* are shown. Multiple segment lookup tables may be used in some embodiments, in which one segment lookup table may correspond to each group in the system. In other embodiments, a single segment lookup table may be used which may include segment entries for all groups in the system. Alternatively, group lookup table 713 and segment lookup table 715 may be combined into a single lookup table in which address bits corresponding to the group select may be combined with address bits corresponding to the segment select to select an entry from the combined lookup table. Since a given group may only include a single segment, an address mapping for the given group may not require address bits to determine a segment.

As an example, physical address 610 may include group select bits that correspond to group 650 and segment select bits that correspond to segment 621 of group 650. The group select bits may be used in conjunction with group lookup table 713 to identify group 650 as the group corresponding to physical address 610. Group lookup table may include a reference to segment lookup table 715. Based upon the reference from group lookup table 713, bits from physical address 610 may be identified as the segment select bits for group 650 that identify segment 621. Using the identified segment select bits, a corresponding address mask may be found in segment lookup table 715 and sent to address decoder 718. Since segment 621 from FIG. 6 includes a coarse-grained interleaving pattern, the address mask may cause address decoder 718 to use one or more of the more significant bits of physical address 610 to determine the memory device identifier, which is, in the illustrated example, memory device 601*b*. Remaining bits of physical address 610 may be used as the address within memory device 601*b*. In some embodiments, the remaining bits may need to be further decoded in order to address the correct locations corresponding to segment 621 within memory device 601*b* since the memory device may include multiple segments, such as in this example.

It is noted that the illustration of FIG. 7 is merely a demonstrative example and is simplified for clarity. In other embodiments, address mapping may include additional or different functional blocks. The various lookup tables and address decoders may be implemented using combinational logic, implemented in firmware, or any suitable combination thereof.

Figure 8:
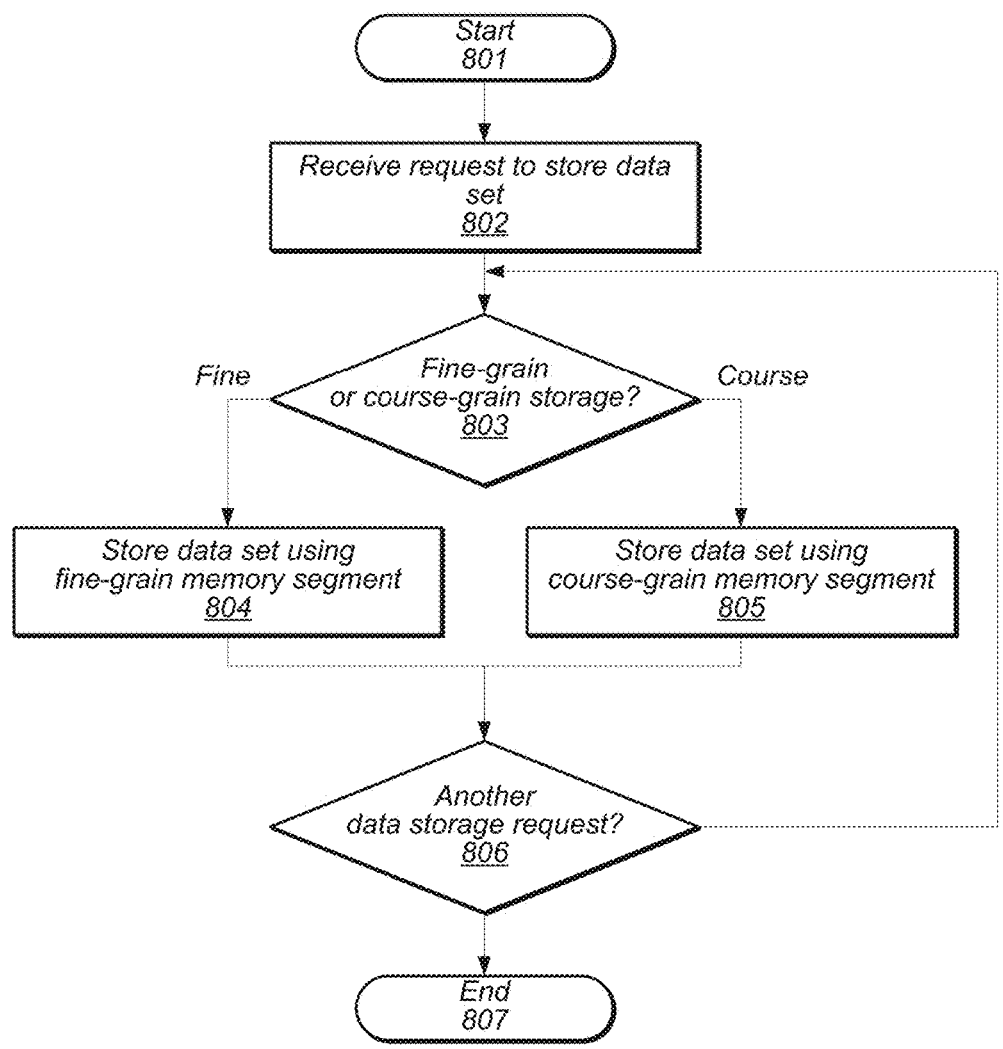
FIG. 8 is a flow diagram illustrating an embodiment of a method for storing data in a memory system supporting both fine-grained and coarse-grained interleaving.

Turning now to FIG. 8, a flowchart for a method for storing data is presented. The method of FIG. 8 may be applied to a system supporting fine-grain and coarse-grain interleaving, such as, for example, system 100 in FIG. 1. Referring collectively to FIG. 1 and FIG. 8, the method may begin in block 801.

A request to store data may be received (block 802). A processor, such as host processor 101, may receive the request and receive the data to be stored. In other embodiments, another processor (not shown) in system 100 may receive the request instead of host processor 101. The request to store data may come from various sources, such as, but not limited to, another processor, user input, or a software application running on host processor 101. In some cases, the data to be stored may be generated by host processor 101 rather than received from another source.

A determination may then be made regarding the type of interleaving to be used for storing the data (block 803). Host processor 101 may need to determine if the data is to be stored using fine-grain or coarse-grain interleaving. The determination may be made based on various criteria. For example, a value may be received along with the storage request, which may indicate the type of interleaving. Alternatively, the data may be of a certain type or format which may determine the type of interleaving. Another example may be related to a processor or subsystem that may be the primary user of the data, such as, a graphics processor. For example, referring to FIG. 2, if processor 201 is a graphics processor, data related to the graphics processor may be stored only in memory device 200, allowing processor 201 to have faster access to the data than if fine-grained interleaving were used to store the data. If coarse-grain interleaving is determined, then the method may move to block 805. Otherwise, fine-grain storage may be used.

If fine-grain interleaving is to be used, then the data may be stored in a memory segment supporting fine-grained storage (block 804). Host processor 101 may store the data in a fine-grain memory segment such as segment 420 from FIG. 4 or segment 620 from FIG. 6. The method may then move to block 806 to determine if another storage request has been received.

If coarse-grain interleaving is selected, then the data may be stored in a memory segment supporting coarse-grained storage (block 805). In this case, host processor may store the data in a coarse-grain memory segment such as segment 421 from FIG. 4 or segment 621 or segment 630 from FIG. 6.

A determination may be made if another storage request has been received (block 806). If another storage request has been received, the method may return to block 803 to determine the type of interleaving to use for storage of the data. Otherwise, the method may end in block 807.

It is noted that the method of FIG. 8 is merely an example. In some embodiments, a different number of operations may be used, and some of the operations may be performed in parallel.

Figure 9:
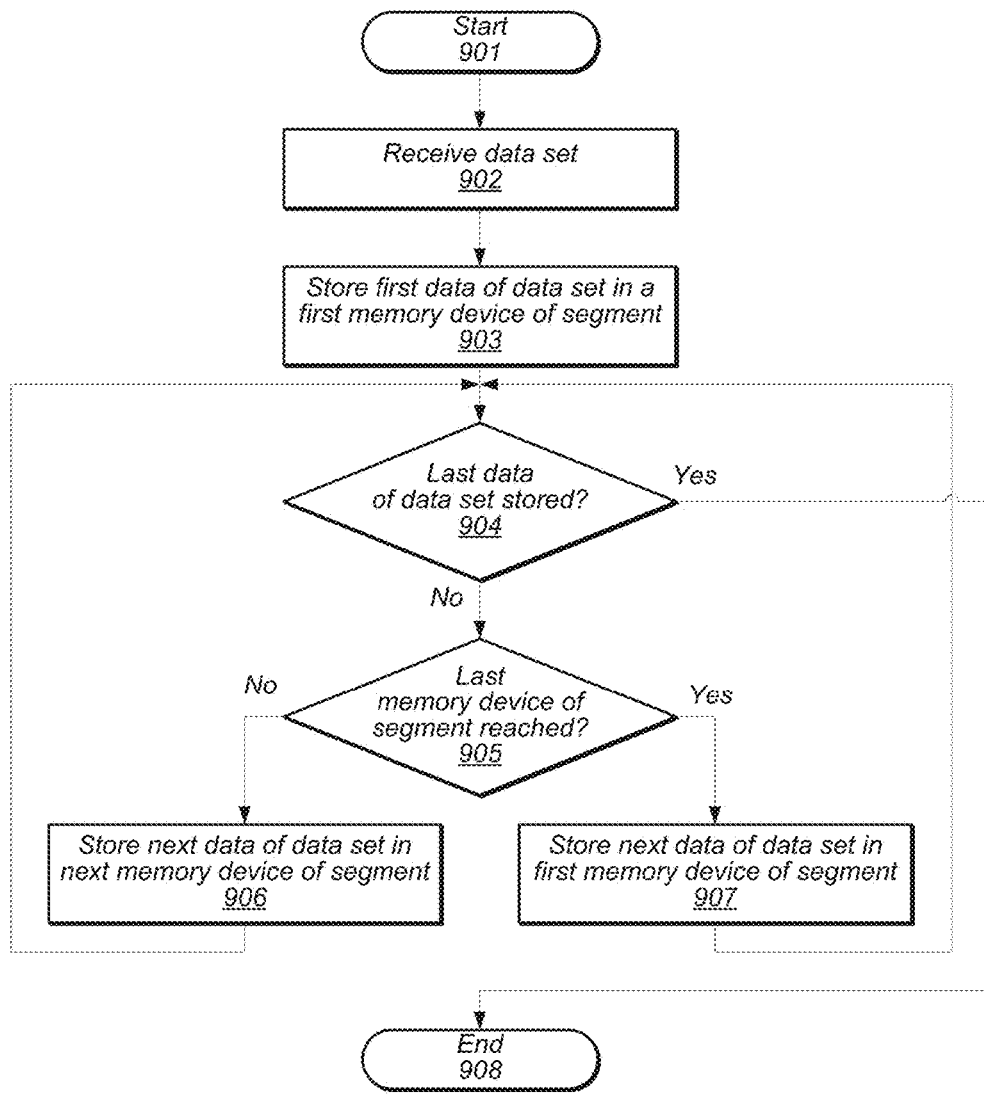
FIG. 9 is a flow diagram illustrating an embodiment of a method for storing data in a fine-grain interleaved memory space.

Moving to FIG. 9, a flowchart is illustrated depicting an embodiment of a method of storing data using fine-grained interleaving. The method may apply to a system such as system 100 of FIG. 1, and may correspond to the interleaving pattern of FIG. 4 and may correspond to block 804 of FIG. 8. Referring collectively to FIG. 1, FIG. 4 and FIG. 9, the method may begin in block 901.

A processor may then receive a data set and a starting address for storing the data set (block 902). The starting address may map to a memory supporting fine-grained interleaving. The processor may correspond to host processor 101 as illustrated in FIG. 1, and the memory may refer collectively to memory devices 401a-d as depicted in FIG. 4. The data set may consist of a plurality of data blocks, such that a given data block is a largest amount of data that can be stored in a single memory device in a single read or write operation. Quantities of data larger than a block may be split into multiple blocks such that each one of the multiple blocks may be stored in different memory devices. The memory devices may be organized into memory segments such as segment 420 and segment 421, in which each memory segment may be capable of storing multiple data blocks. The starting address may map to segment 420 which may support fine-grain interleaving.

A first data block may then be stored in a first memory device (block 903). A data block may correspond to an addressable quantity of data (of arbitrary width depending upon the particular implementation) that is accessed in response to a given read or write request to a given memory device. Host processor 101 may store the first data block into a first location, corresponding to the starting address, in memory segment 420 of memory device 401a. In other embodiments, the first data block may be stored in any of the other memory devices associated with memory segment 420. For example, the starting address may reference a starting location in memory device 401c within memory segment 420. The referenced starting location may be a next empty location within memory segment 420 or it may be a location currently storing data which is to be rewritten.

It is noted that FIG. 4 denotes the interleaving pattern as starting with memory device 401a and ending in 401d. In other embodiments, however, any suitable order of memory devices may be possible, such as, for example, the pattern may start in 401c and progress to 401b, to 401d and then to 401a before starting again in 401c.

The method may next depend on a determination if the last data block of the data set has been stored (block 904). If the last data block has been stored, then the method may end in block (908). Otherwise, a determination may be made to select a location for storing the next data block.

The method may now depend on a determination if the last memory device in the memory segment has been reached (block 905). In the example of FIG. 4, the last memory device of memory segment 420 is memory device 401d. If the most recent data block was stored in memory device 401d, then the next data block may be stored in memory device 401a. Otherwise, the next data block may be stored in the next memory device (block 906).

The example interleaving pattern illustrated in FIG. 4 follows a simple pattern for determining the next memory device, as shown by path 425. The pattern for memory segment 420 goes memory device 401a to memory device 401b to memory device 401c to memory device 401d. As stated above, memory device 401d is the last memory device in memory segment 420. Once the data block has been stored, the method may return to block 904 to determine if the last data has been stored.

If the most recent data block was stored in the last memory device in the memory segment, then the next data block may be stored in the first data block (block 907). The interleaving pattern for memory segment 420 may go from memory device 401d, back to memory device 401a. Once the data block has been stored, the method may return to block 904 to determine if the last data has been stored.

It is noted that method of FIG. 9 is merely an example for the purpose of demonstrating fine-grain interleaving, and that some of the operations are depicted as being performed sequentially. In other embodiments, one or more of the operations may be performed in parallel.

Figure 10:
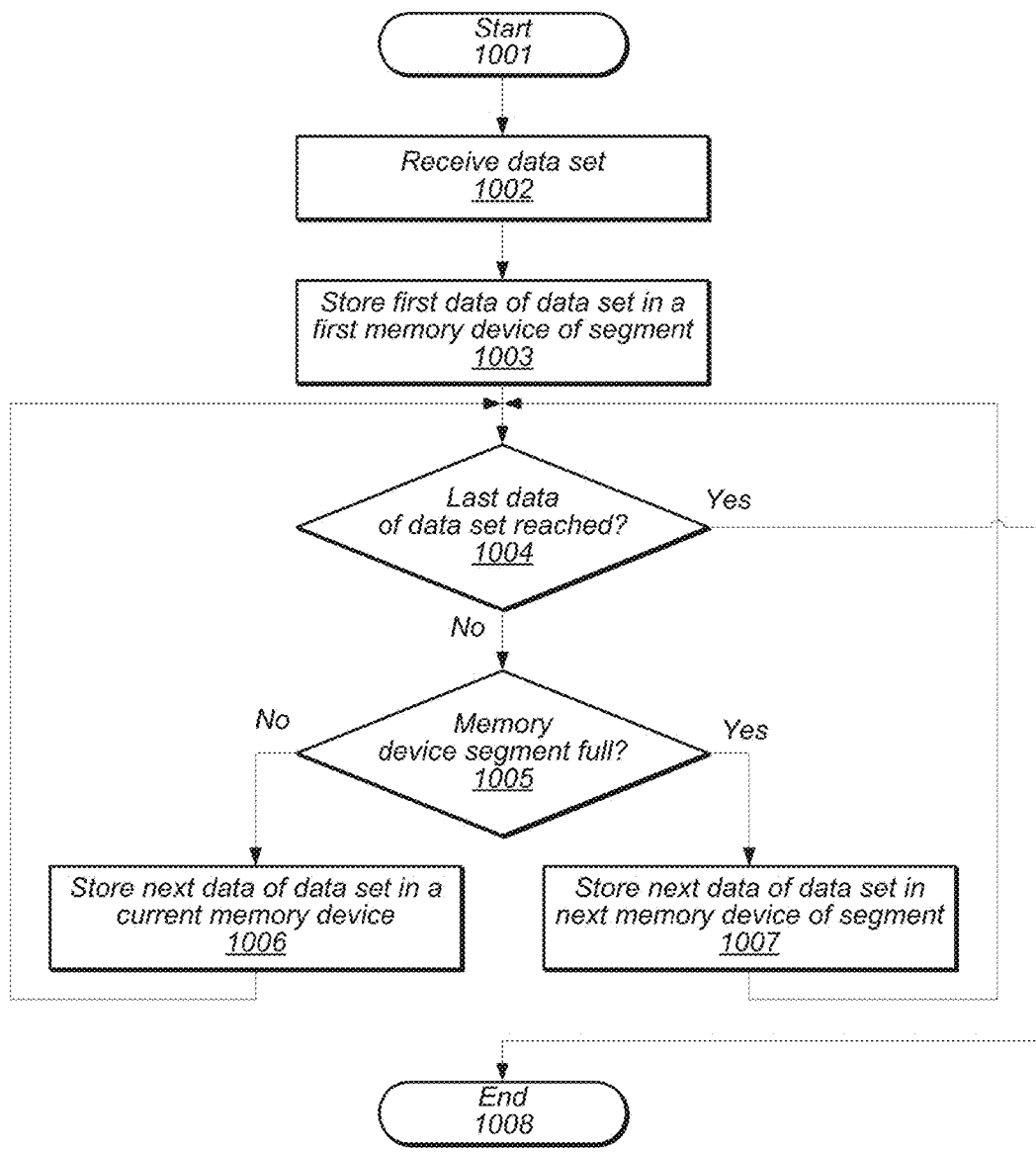
FIG. 10 is a flow diagram illustrating an embodiment of a method for storing data in a coarse-grain interleaved memory space.

Moving to FIG. 10, a flowchart for a method of storing data using coarse grain interleaving is illustrated. The method may be applied to an interleaving pattern such as the interleaving pattern shown in FIG. 6 and may be applied to system 100 of FIG. 1. Referring collectively to FIG. 1, FIG. 6, and FIG. 10, the method may begin in block 1001.

A processor may then receive a data set and a starting address for storing the data set (block 1002). The starting address may map to a memory supporting coarse-grained interleaving. The processor may correspond to host processor 101 as illustrated in FIG. 1, and the memory may refer collectively to memory devices 601a-d as depicted in FIG. 6. The data set may consist of a plurality of data blocks, such as described above in the description of FIG. 9. The memory devices may be organized into memory segments such as segment 620 and segment 621 in group 650, and segment 630 in group 651. Each memory segment may be capable of storing multiple data blocks. The starting address may map to segment 621 of group 650 for storing the data set with coarse-grain interleaving.

A first data block may then be stored in a first memory device (block 1003). A data block may be of any suitable size, as previously disclosed. Host processor 101 may store the first data block into a first location, corresponding to the starting address, in memory segment 621 of memory device 601a, following the path of the dashed lines in FIG. 6. As was described in regards to block 903 of FIG. 9, the starting address may reference a location anywhere within memory segment 621. The referenced location may be a next empty location within memory segment 621 or it may be another location in another memory device within segment 621, such as, for example, memory device 601b.

The method may then depend on a determination if the last data block of the data set has been stored (block 1004). If the last data block has been stored, then the method may end in block (1008). Otherwise, a determination may be made to select a location for storing the next data block.

The method may now depend on a determination if the memory segment in the current memory device is full (block 1005). If the most recent data block was stored in the last location of memory segment 621 in memory device 601*a*, then the next data block may be stored in memory segment 621 of memory device 601*b*. Otherwise, the next data block may be stored in the next location in memory device 601*a* (block 1006).

The interleaving pattern embodiment of FIG. 6 follows path 625 (as indicated by the dashed line) for determining the next memory location. The pattern for memory segment 621 starts with memory segment 621 of memory device 601*a*. Once the segment of memory device 601*a* has been filled, the pattern moves to memory segment 621 of memory device 601*b*. Once the data block has been stored, the method may return to block 1004 to determine if the last data has been stored.

If the most recent data block was stored in the last memory location of the memory segment in the current memory device, then the next data block may be stored in the next memory device (block 1007). The interleaving pattern for memory segment 621 may go from memory device 601*a* to memory device 601*b*. If the last memory location of memory segment 621 in memory device 601*b* is reached (i.e., the last memory location of memory segment 621), a new memory segment may need to be selected if the current data set includes data yet to be stored. A new memory segment supporting coarse-grain interleaving may be selected, such as, for example, memory segment 630 in memory devices 601*c* and memory device 601*d*. In other embodiments, another coarse-grain segment (not shown) may be available in group 650, and may be selected. After the data block has been stored, the method may return to block 1004 to determine if the last data has been stored.

The method depicted in the flowchart illustrated in FIG. 10 is merely an example for demonstrating coarse-grain interleaving. In other embodiments, different operations and different orders of operations may be employed.

Figure 11:
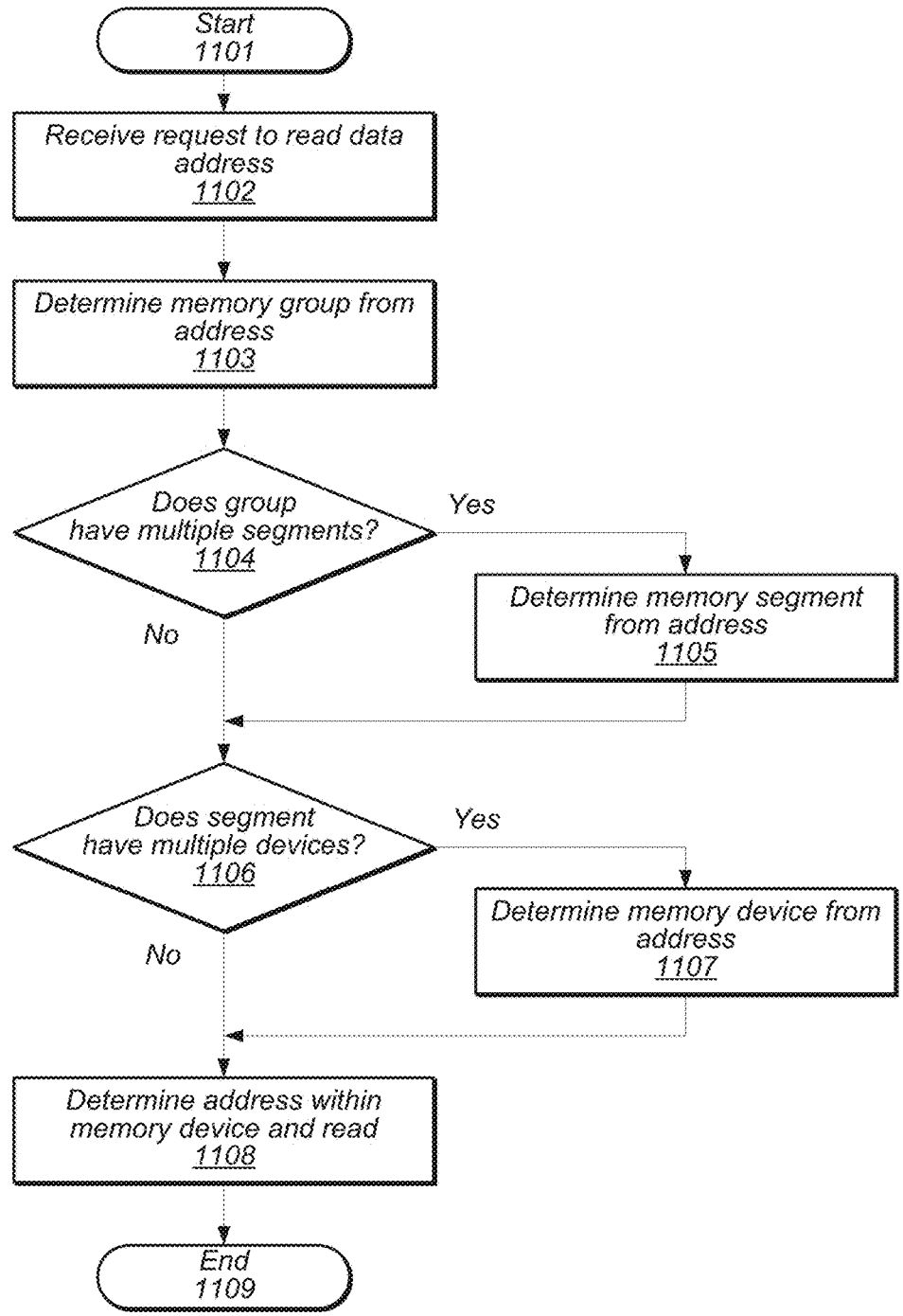
FIG. 11 is a flow diagram illustrating an embodiment of a method for reading data from a memory space supporting both fine-grained and coarse-grained interleaving.

Turning now to FIG. 11, a flowchart for a method of reading data is presented. Stored data may be referenced by a physical address which, in some embodiments, may correspond to one location, in one memory device, in one memory segment within that one memory device, all within one memory group. A method may be required to identify which location, in which device, in which segment, in which memory group a physical address is referencing. The method may be applied to a system such as system 100 as illustrated in FIG. 1, which may utilize an interleaving pattern such as the interleaving pattern shown in FIG. 6. System 100 may also utilize an addressing scheme as illustrated in FIG. 7. Referring collectively to FIG. 1, FIG. 6, FIG. 7, and FIG. 11, the method may begin in block 1101.

A processor such as host processor 101 may receive a request to read data (block 1102). The request may, in some embodiments, come from another processor in the system or in other embodiments, may come from software running on host processor 101. The data may be stored in a memory consisting of memory devices 601*a-d*, and may have been stored using the interleaving pattern shown in FIG. 6. An address may be received along with the read request. The address may be a physical address for the combined memory of memory devices 601*a-d*. In other embodiments, the address may be a logical address and may be mapped to a physical address before continuing to the next step.

Bits from the physical address may be read to determine a memory group (block 1103). In some embodiments, the memory may be organized into multiple groups, in which case, the memory group containing the physical address may be determined. The group may be determined dependent upon one or more bits from the physical address, referred to herein as "group select bits." The group select bits may be used to determine a memory group from group lookup table 713. In some embodiments, the group select bits may be used directly, with no pre-processing. In other embodiments, dedicated hardware and/or a generic processor executing software instructions may process the group select bits before the bits are used with group lookup table 713 to determine a group entry corresponding to the memory group. The group entry from group lookup table 713 may be used to determine a memory segment.

A determination may be made dependent upon the number of segments in the determined memory group (block 1104). In some embodiments, a memory group may have a single memory segment. In other embodiments, all memory groups may have more than one memory segment, in which case this determination step may be omitted and the method may go straight to block 1105 to determine the memory segment. The group entry may include a value to indicate a number of segments included in the group. In some embodiments, additional processing may be required to determine if the selected memory group includes multiple segments. If multiple memory segments are determined, then the method may move to block 1105 to determine which memory segment the physical address references. Otherwise, if only a single memory segment is in the memory group, the method may move to block 1106 to determine if multiple memory devices are included in the group.

The group entry may be used to select the memory segment which the physical address references (block 1105). Additional bits from the physical address (referred to herein as "segment select bits") may be used in conjunction with the group entry to select an entry from segment lookup table 715. The group entry and segment select bits may be used directly with segment lookup table 715 or in other embodiments, may require processing before use. In some embodiments, group lookup table 713 and segment lookup table 715 may be combined into a single lookup table, which may be referenced with the combined group select bits and segment select bits. An entry from segment lookup table 715 may be selected based upon the group entry and segment select bits. The selected entry may be referred to as the "segment entry" and may correspond to the memory segment referenced by physical address 610.

The method may depend upon a number of memory devices included in the referenced memory segment (block 1106). If the number of memory devices in the segment is greater than one, then the device referenced by physical address 610 may be identified in block 1107. Otherwise, if only one memory device is in the segment, then an address within the memory device may be identified in block 1108.

The segment entry may be used to select the memory device which physical address 610 references (block 1107). Similar to the segment select in block 1105, an additional one or more bits ("device select bits") may be used in combination with the segment entry to determine the memory device referenced by physical address 610. Which bits from physical address 610 are used may, in some embodiments, be determined by the segment entry. In other embodiments, the group entry may be used. In some embodiments, the device select bits may be used in conjunction with a multiplexor circuit to select the memory device. Once the referenced memory device has been identified, the next step may be to determine the referenced address within the memory device.

With the memory group, memory segment, and memory device identified, an address within the memory device may be determined (i.e., device address) (block 1108). In some embodiments, the address within the determined memory device may consist of the physical address bits not used for the group select bits, segment select bits, and device select bits. In other embodiments, some processing may be performed to establish the address in the device. With the device address known, the referenced location may be read and the value returned to the requesting processor.

It is noted that the method depicted in FIG. 11 is merely an example. In other embodiments, the method may be applied to an interleaving pattern such as shown in FIG. 4 rather than the interleaving pattern shown in FIG. 6 as presented above. Different operations and different orders of operations may be employed in other embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for storing data in a data subsystem including a plurality of memory devices, wherein each memory device of the plurality of memory devices is accessed by a host processor via a memory bus, and wherein a coprocessor accesses a first memory device of the plurality of memory devices via a plurality of interconnects, and wherein the coprocessor accesses remaining ones of the plurality of memory devices via the memory bus, the method comprising:
   receiving a first plurality of data blocks;
   determining, by the host processor, if the first plurality of data blocks is to be primarily accessed by the host processor or by the coprocessor;
   storing successive data blocks of the first plurality of data blocks in an interleaved pattern across each one of the plurality of memory devices in response to determining that the first plurality of data blocks is to be primarily accessed by the host processor via the memory bus;
   receiving a second plurality of data blocks, wherein each data block of the first plurality of data blocks and each data block of the second plurality of data blocks are of equal size;
   determining, by the host processor, if the second plurality of data blocks is to be primarily accessed by the host processor or by the coprocessor; and
   storing successive data blocks of the second plurality of data blocks in contiguous storage locations of the first memory device in response to determining that the second plurality of data blocks is to be primarily accessed by the coprocessor via the plurality of interconnects.

2. The method of claim 1, wherein data stored in the first memory device includes at least one data block of the first plurality of data blocks, and at least two data blocks of the second plurality of data blocks.

3. The method of claim 2, wherein the first memory device includes a plurality of memory dies.

4. The method of claim 3, wherein the at least one data block is stored in a first memory die of the plurality of memory dies, and the at least two data blocks are stored in a second memory die of the plurality of memory dies.

5. The method of claim 1, wherein storing the successive data blocks of the first plurality of data blocks in an interleaved pattern across each one of the plurality of memory devices comprises storing each data block of a first contiguous subset of the first plurality of data blocks in a respective one of the plurality of memory devices before storing each data block of a second contiguous subset of the first plurality of data blocks in a respective one of the plurality of memory devices.

6. The method of claim 1, further comprising storing additional data blocks of the second plurality of data blocks in a second memory device of the plurality of memory devices in response to a determination that the first memory device cannot store further data blocks of the second plurality of data blocks.

7. The method of claim 1, further comprising allocating a pre-determined amount of data of the first memory device for storing data that is to be accessed by the coprocessor.

8. An apparatus, comprising:
   a plurality of memory devices;
   a coprocessor coupled to a first memory device of the plurality of memory devices via a plurality of interconnects, and coupled to remaining ones of the plurality of memory devices via a memory bus; and
   a processor coupled to each memory device of the plurality of memory devices via the memory bus, wherein the processor is configured to:
   receive a first plurality of data blocks;
   determine if the first plurality of data blocks is to be primarily accessed by the processor or by the coprocessor;
   store successive data blocks of the first plurality of data blocks in an interleaved pattern across each one of the plurality of memory devices in response to a determination that the first plurality of data blocks is to be accessed by the processor via the memory bus;
   receive a second plurality of data blocks, wherein each data block of the first plurality of data blocks and each data block of the second plurality of data blocks are of equal size;
   determine if the second plurality of data blocks is to be primarily accessed by the processor or by the coprocessor; and
   store successive data blocks of the second plurality of data blocks in contiguous storage locations in the first memory device in response to a determination that the second plurality of data blocks is to be primarily accessed by the coprocessor via the plurality of interconnects.

9. The apparatus of claim 8, wherein data stored in the first memory device includes at least one data block of the first plurality of data blocks, and at least two data blocks of the second plurality of data blocks.

10. The apparatus of claim 9, wherein the first memory device includes a plurality of memory dies, and wherein the at least one data block is stored in a first memory die of the plurality of memory dies, and the at least two data blocks are stored in a second memory die of the plurality of memory dies.

11. The apparatus of claim 8, wherein to store the successive data blocks of the first plurality of data blocks in an interleaved pattern across each one of the plurality of memory devices, the processor is further configured to store each data block of a first contiguous subset of the first plurality of data blocks in a respective one of the plurality of memory devices before storing each data block of a second contiguous subset of the first plurality of data blocks in a respective one of the plurality of memory devices.

12. The apparatus of claim 8, wherein the processor is further configured to store additional data blocks of the second plurality of data blocks in a second memory device of the plurality of memory devices in response to a determination that the first memory device cannot store further data blocks of the second plurality of data blocks.

13. The apparatus of claim 8, wherein the coprocessor is configured to:
receive a third plurality of data blocks; and
store data blocks of the third plurality of data blocks in contiguous storage locations of the first memory device.

14. The apparatus of claim 8, wherein the processor is further configured to allocate a pre-determined amount of storage locations of the first memory device for storing data that is to be accessed by the coprocessor.

15. A computer-accessible non-transitory storage medium having program instructions stored therein that, in response to execution by a processor, cause the processor to perform operations comprising:
receiving a first plurality of data blocks;
determining if the first plurality of data blocks is to be primarily accessed by the processor or by a coprocessor;
storing successive data blocks of the first plurality of data blocks in an interleaved pattern across each one of a plurality of memory devices coupled to the processor via a memory bus, in response to determining that the first plurality of data blocks is to be primarily accessed by the processor via the memory bus;
receiving a second plurality of data blocks, wherein each data block of the first plurality of data blocks and each data block of the second plurality of data blocks are of equal size;
determining if the second plurality of data blocks is to be primarily accessed by the processor or by the coprocessor; and
storing successive data blocks of the second plurality of data blocks in contiguous storage locations of a first memory device in response to a determination that the second plurality of data blocks is to be primarily accessed by a coprocessor coupled to the first memory device via a plurality of interconnects, different from the memory bus;
wherein the coprocessor accesses data in remaining ones of the plurality of memory devices via the memory bus.

16. The computer-accessible non-transitory storage medium of claim 15, wherein data stored in the first memory device includes at least one data block of the first plurality of data blocks, and at least two data blocks of the second plurality of data blocks.

17. The computer-accessible non-transitory storage medium of claim 16, wherein storing the successive data blocks of the first plurality of data blocks in the interleaved pattern across each one of the plurality of memory devices comprises storing the at least one data block of the first plurality of data blocks in a first memory die of a plurality of memory dies of the first memory device.

18. The computer-accessible non-transitory storage medium of claim 17, wherein storing the successive data blocks of the second plurality of data blocks in the contiguous storage locations of the first memory device comprises storing the at least two data blocks of the second plurality of data blocks in a second memory die of the plurality of memory dies of the first memory device.

19. The computer-accessible non-transitory storage medium of claim 15, wherein storing the successive data blocks of the first plurality of data blocks in an interleaved pattern across each one of the plurality of memory devices comprises storing each data block of a first contiguous subset of the first plurality of data blocks in a respective one of the plurality of memory devices before storing each data block of a second contiguous subset of the first plurality of data blocks in a respective one of the plurality of memory devices.

20. The computer-accessible non-transitory storage medium of claim 15, further comprising storing additional data blocks of the second plurality of data blocks in a second memory device of the plurality of memory devices in response to a determination that the first memory device cannot store further data blocks of the second plurality of data blocks.

\* \* \* \* \*